United States Patent [19]
Kuji et al.

[11] 3,944,478
[45] Mar. 16, 1976

[54] ELECTROLYTIC DRAINAGE TREATING APPARATUS

[75] Inventors: Yoichi Kuji; Tuyoshi Kato; Nagao Saito, all of Nagoya, Japan

[73] Assignee: Mitsubishi Denki Kabushiki Kaisha, Tokyo, Japan

[22] Filed: May 2, 1974

[21] Appl. No.: 466,192

[30] Foreign Application Priority Data

| May 2, 1973 | Japan | 48-49570 |
| May 19, 1973 | Japan | 48-46175 |
| May 23, 1973 | Japan | 48-57516 |
| July 4, 1973 | Japan | 48-75480 |
| July 6, 1973 | Japan | 48-76864 |

[52] U.S. Cl. ............... 204/275; 204/149; 210/44; 210/221 R
[51] Int. Cl.² .... C02B 1/82; B01K 5/00; C02C 5/12
[58] Field of Search ........... 204/149, 152, 275, 276, 204/228, 277, 278; 210/44, 221

[56] References Cited
UNITED STATES PATENTS

| 1,146,942 | 7/1915 | Landreth | 204/149 |
| 3,347,786 | 10/1967 | Baer et al. | 204/149 X |
| 3,505,188 | 4/1970 | Pan | 204/149 |
| 3,518,174 | 6/1970 | Inoue | 204/149 |
| 3,543,936 | 12/1970 | Abson et al. | 210/221 |
| 3,835,020 | 9/1974 | Galneder | 204/149 X |

*Primary Examiner*—G. L. Kaplan
*Assistant Examiner*—A. C. Prescott
*Attorney, Agent, or Firm*—Oblon, Fisher, Spivak, McClelland & Maier

[57] ABSTRACT

An electrolytic drainage treating apparatus is provided to treat a drainage containing a suspension of contaminated compound whereby the suspension is flocculated and removed by aluminum ions or iron ions eluted by electrolysis. The electrolytic drainage treating apparatus is equipped with a high speed electrolyzer comprising an anode and a cathode having a thin gap therebetween through which a drainage is forcibly passed as an electrolytic solution. The anode material such as aluminum and iron is eluted as ions by the electrolysis caused by passing electric current across the gap. The width of the gap between the anode and the cathode is controlled. The high speed electrolyzer is effectively used for various electrolytic treatments.

27 Claims, 19 Drawing Figures

ELECTROLYTIC DRAINAGE TREATING APPARATUS

BACKGROUND OF THE INVENTION

1. Field of the Invention:

This invention relates to electrolytic drainage treating apparatus.

2. Description of the Prior Art:

It is known to provide electrolytic treatments for cleaning drainages by removing contaminated components in suspension or solution with the flocculating effect of aluminum ions which are eluted by the electrolysis of aluminum. This has been found useful in cleaning drainages containing an insoluble colloidal suspension of ions of organic compounds or inorganic compounds such as dyeing drainages, food industrial drainages, and acidic drainages.

Figure 1:
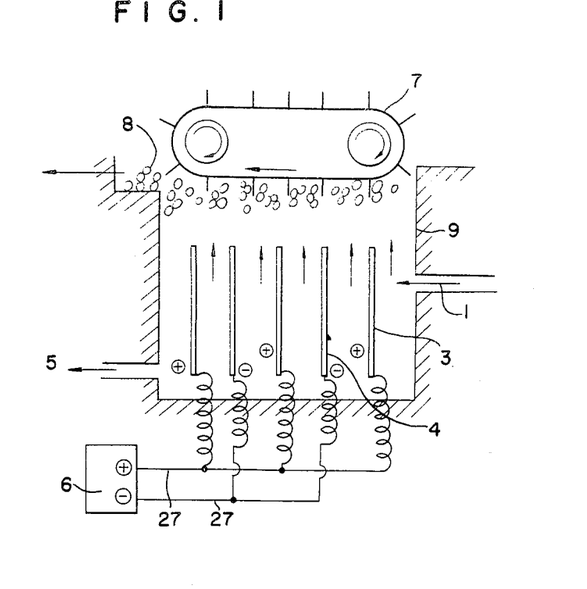
FIG. 1 is a schematic view of one typical conventional electrolytic drainage treating apparatus.

Referring to FIG. 1, the structure and operation of a typical conventional electrolytic treating apparatus will be illustrated. In FIG. 1, reference numeral 1 designates a drainage fed to an electrolyzer 9; 3 designates an anode made of aluminum; and 4 designates a cathode made of stainless steel or mild steel. A plurality of anode plates and cathode plates are connected in parallel to which DC current is supplied from a DC power source 6, 5 designates an outlet of the treated drainage.

In the apparatus shown in FIG. 1, aluminum of anode 3 is eluted as ions by passing DC current across the plates whereby the contaminated components are flocculated by the effect of the aluminum ions to form floc. The floc is floated with gas generated by the electrolysis (mainly hydrogen gas generated from the cathode) becoming scum 8 which is floated on the surface of the electrolytic solution in the electrolyzer 9. The scum 8 is scraped off by a skimmer 7 and clean water is discharged from the bottom of the electrolyzer.

However, in the above-mentioned electrolytic treating apparatus, the equivalent resistancee between the electrodes is increased which prevents current flow and which prevents electrolytic operation by contamination of the electrode surface caused by surface coated material (hereinafter referring to as scale) and by deposition of gas and other contaminated materials.

Because of the scale, the electrodes are rendered inactive. The inactivated state is caused after tens of hours or may occur after hundreds of hours of continuous operation. The surface electric current density of the electrode in the above noted operation is usually low such as about several $mA/cm^2$. Because of this, large surface electrodes are used and a plurality of electrode plates are arranged in parallel with gaps of several cm. The current density of the electrodes is kept low in order to decrease the rate of elute per unit area of the anode so as to maintain a relatively long term active operation of the electrodes. Several tens of volts have been found necessary for the electrode gaps of several cm. For example, the treatment of dyeing drainage at a rate of $20 m^3/hour$ requires 50 ppm of aluminum ions. The current required for the electrolysis is about 3000 A. The electrode surface S is given by the equation $$S = \frac{300 A}{2 mA/cm^2} = 1500 \times 10^3 \, cm^2 = 150 \, m^2$$

wherein current density $J = 2 mA/cm^2$.

When an electrode plate having an area of 1 $m^2$ is used and current is passed from both surfaces of the electrode, about 75 sheets of anode plates are required with the result that about 150 sheets of anode and cathode plates are required. Accordingly, the largeness of the electrolyzer required creates quite a burden.

It is usual to decrease the specific resistance P of the drainage by adding electrolyte. The specific resistance P can be about 500 ohms. The ohmic drop V between the electrodes is given by the equation $$V = JPg = 2 \times 10^{-3} \times 500 \times 5 = 5 \text{ volts}$$ wherein the gap between electrodes electrodes g is 5 cm.

The equivalent resistance in the gap is quite higher than P because of the effects of scale and polarization. In practice, about 30 – 40 volts of applied voltage is necessary. In order to generate current in the case of an increase of electrode equivalent resistance caused by an increase of scale, it is usual to provide a DC power source of 50 – 100 volt which is greater than the ohmic drop.

However, this is not economical because of the requirements of a large power source. Thus the passive state caused by the scale etc. cannot be prevented by this procedure because of its impracticality.

A dyeing drainage contains a large quantity of colloid with the result that the colloid is flocculated with aluminum ions by the electrochemical method to obtain a clean drainage. However, in the conventional process, the separation of the scale by self-diffusion is not possible because the velocity of the electrolytic solution in the gap is too slow whereby the polarization on the surface of the electrodes is high. The drainage having high specific resistance is used as the electrolytic solution. Accordingly, it is difficult to perform the electrolysis in high current concentration and density and the electrolysis having low current concentraion of about several hundreds mA/1 and low current density of several hundreds $mA/cm^2$ has been performed. Therefore, in order to give the coulometric concentration for eluting aluminum ions required for the cleaning of the drainage, it is necessary to electrolyze for an extended period. This has proved to be impractical for large volume drainage.

Moreover, in the conventional process, the scum flocculated with the aluminum ions eluted from the anode is fine floc. The scum is floated moving gradually in the gap from the anode. The floated scum 8 is discharged from the electrolyzer 9 by a skimmer 7. The gas used for the float of the floc is hydrogen gas which is generated on the cathode surface. The gap between the electrodes is quite broad, i.e., 10 – 100 mm. The diffusion of hydrogen gas is not sufficient and the fine bubbles of hydrogen gas are combined to form large bubbles which float at high velocity whereby the electrolytic solution is stirred to decrease the effect of flotation of the floc. The separation of the floc by floating is performed in the electrolyzer 9 between the electrodes at the time of electrolysis. Accordingly, the time for forming the floc from the insoluble suspension is too short. The direction of flow of the electrolytic solution of the drainage in the gap between the electrodes is from the upper part to the lower part as shown in FIG. 1. The fine floc is mixed in the treated drainage 5 making it difficult to obtain clean treated drainage. These are some of the disadvantages which have been found in the conventional apparatus.

SUMMARY OF THE INVENTION

It is an object of the present invention to provide an electrolytic drainage treating apparatus for treating a drainage containing an insoluble suspension of contaminated materials.

Other objects will appear hereinafter. In accordance with these objects, the electrolytic drainage treating apparatus is equipped with a high speed electrolyzer comprising an anode and a cathode which are disposed with a gap therebetween through which a drainage is forcibly passed as an electrolytic solution. The anode material such as aluminum and iron is eluted as ions by the electrolysis caused by passing electric current across the gap. Also, in accordance with the present invention, the width of the gap between the anode and the cathode is controlled. The high speed electrolyzer in accordance with the present invention may be used for various electrolytic treatments.

BRIEF DESCRIPTION OF THE DRAWINGS

FIGS. 2 ($a$), ($b$), ($c$) are schematic views showing a principle of the invention;

FIGS. 5 ($a$) – ($d$) are schematic views of other types of spacers;

DETAILED DESCRIPTION OF THE PREFERRED EMBODIMENTS

Figure 2:
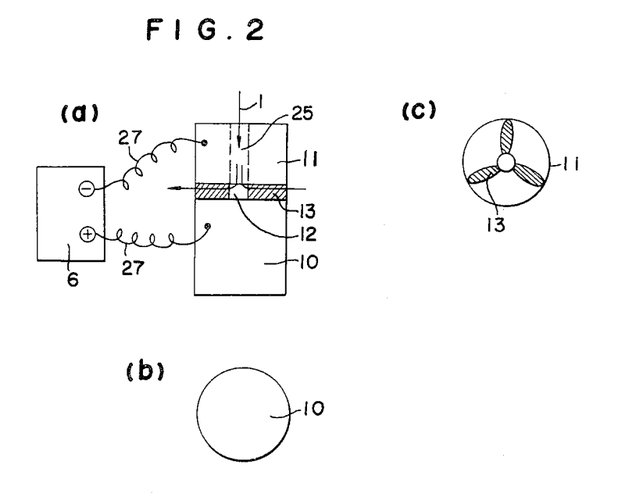

The first feature of the invention is to provide a high speed electrolizer 15 with electrodes 10, 11. Referring to FIGS. 2$a$, $b$, $c$, the principle of the invention using the anode 10 made of aluminum is illustrated. In FIGS. 2$a$, $b$, $c$, the reference numeral 10 designates an anode and 11 designates a cathode made of stainless steel or mild steel. A drainage 1 for electrolytic treatment is forcibly fed to a thin gap 12 between the anode and the cathode through a hole 25 of the cathode 11. A spacer 13 is made of an electrical insulator such as stone or Teflon for maintaining the thin gap 12 and is mounted on the cathode 11. A DC current source 6 supplies current for eluting aluminum in the gap. One characteristic of the system is to pass forcibly the drainage 1 through the small gap whereby the scale, gas and the other contaminated components deposed on the surface of the electrodes are washed out to form clean surfaces of the electrodes and the condition of the gap.

Optimum results can be obtained by providing the thin gap 12 of 0.5 - several mm. and the flow velocity of several tens m/s which is enough to remove the scale. A specific resistance of drainage such as a dyeing drainage is about 500 ohms – 1k ohms without adding an electrolyte such as sodium chloride. When the gap is thin gap, the current density of the electrolyte current can be increased, whereby the advantage of a compact apparatus, i.e., a decrease of electric power required for the electrolysis and a minimum capacity for the DC power source, are achieved. The electrolytic current density can be increased to about 0.2 – 1 A/cm$^2$ which is several hundreds times that of the conventional treatment. In the case of dyeing drainage at a rate of 20 mm/hr, the electrode area can be 3000 cm$^2$ = 0.3 m$^2$ which is only one sheet of circular aluminum plate having a diameter of 62 cm when the electrolytic current density J is 1 A/cm$^2$, current is 3000 A and eluted aluminum is 50 ppm.

The ohmic drop between the electrode is given by the equation $V = JPg = 1 \times 500 \times 0.05 = 25$ volts wherein a specific resistance of drainage P is 500 ohms and the width of the gap $g$ is 0.05 cm. In accordance with the apparatus, the scale is removed by the high velocity drainage flow in the thin gap. The gap is kept in clean condition whereby excess voltage drop caused by scale does not occur and continuous stable electrolytic operation can be maintained by applying only about 27 volts which is an addition of about 2 volts to normal polarization voltage and the ohmic voltage drop. Accordingly, the DC power voltage can be about 30 volts (27 volts + allowance).

Since it is unnecessary to consider the increase of the electrode voltage because of formation of the scale, the power capacity can be minimized and the cost of the apparatus can be decreased. In said embodiment, the current density J is 1 A/cm$^2$ because of the decrease of the electrode area. When decrease of power is required, the following design is preferable. In the condition of the electrolytic current of 3000A and the eluted aluminum of 50 ppm, when the current density J is 0.18 A/cm$^2$, the electrode area is 16700 cm$^2$ = 1.7 m$^2$, that is about 1/100 of that of the conventional apparatus.

The ohmic drop in the gap is given by the equation $$V = JPg = 0.18 \times 500 \times 0.05 = 4.5V$$

wherein the gap $g$ is 0.05 cm.. According to rough calculations, the power consumption W is compared with that of the conventional apparatus on the ohmic drop. The invention $W_1 = 3000 \text{ A} \times 4.5A = 13.5$ KW. Conventional apparatus $W_1 = 3000 \text{ A} \times 15$ KW. The power consumption of the invention is smaller than that of the conventional apparatus. In the conventional apparatus, the overvoltage caused by the scale etc., is high. Accordingly, the electrode voltage drop is quite higher than the ohmic drop. In the invention, to the contrary, only about 2 volts of polarization voltage is added to the ohmic drop for the practical electrode voltage drop because the electrode surface is kept in clean condition. Accordingly, the practical power consumption is quite lower than that of the conventional apparatus.

Ths embodiment of the system which removes the deposit caused by the electrolysis only by the flow of the drainage has been illustrated. In FIG. 2a, b, c, the deposit on the anode is mechanically removed by friction of the spacer 13 so as to further clean the anode surface. The spacer 13 is not only for maintaining the gap but also for sliding on the anode surfaces so as to give relative movement of the anode and the cathode. The spacer is mounted on the cathode and contacted to the anode. It is hard to turn the cathode 360° to the anode because of the lead wire connected for supply of the power. All of the anode surface can be contacted by reciprocal turning movement of the cathode to about 130° to the anode when 3 spacers 13 are mounted with a 120° interval. The structure is shown in FIG. 2c.

In FIGS. 2a, b, c, the drainage is injected from the hole of the cathode to the gap 12. If the hole faces the same part of the anode surface, the convecto is formed on part of the aluminum anode. Accordingly, it is preferable to form the hole in eccentrical position so that the relative position of the hole is moved on the anode surface in the reciprocal turning of the cathode so as to dissolve the aluminum anode uniformly to prevent the formation of a short-circuit by the convecto.

In FIGS. 2a, b, c, the drainage is fed from the hole of the cathode to the gap, in the direction to the anode. However, it is possible to feed the drainage from a side of the electrodes to the thin gap in the direction parallel to the electrodes. The principle of the invention has been illustrated above.

Figure 3:
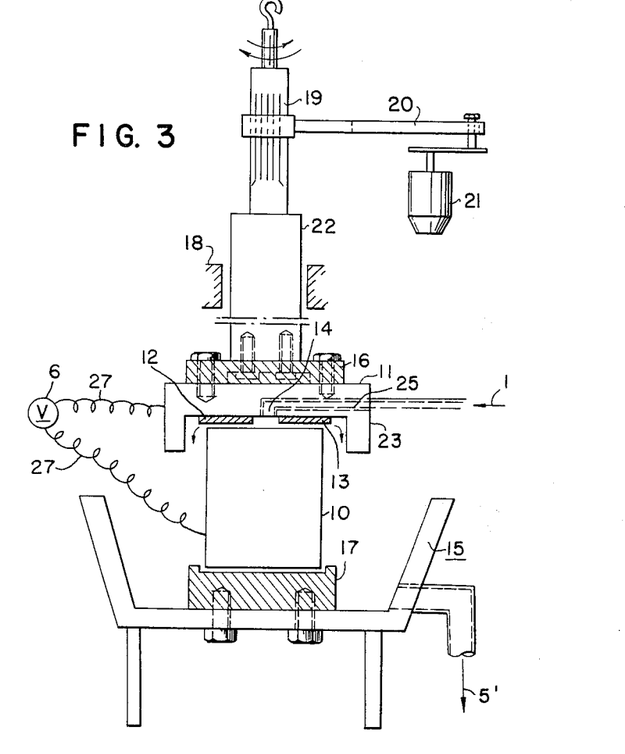
FIG. 3 is a schematic view of one embodiment of the electrolyzer of the invention.

One embodiment of the apparatus of the invention will be illustrated referring to FIG. 3, wherein the cathode 11 made of stainless steel or other conductive material and the anode 10 made of aluminum is disposed with the thin gap 12 through the spacer 13 made of a highly abrasive electrical insulator such as stone. The drainage 1 is forcibly passed as an electrolytic solution from the inlet 14 to the gap between the electrodes. The DC current is passed by the power source 6 to electrolyze the drainage to obtain the treated drainage 5' containing floc. The anode is decreased by the electrolysis.

In FIG. 3, the cathode placed above the anode is automatically dropped by the dead weight so as to maintain the gap between the electrodes with the spacer 13. The anode 10 is displaced by the relative movement of the cathode to contact the spacer 13 mounted on the cathode in the electrolysis. Thus, the insoluble suspension is flocculated by electrochemical discharge with the aluminum ions eluted from the anode 10 by the electrolysis so as to form floc. Hydrogen gas is generated from the cathode surface 11.

Figures 4, 7:
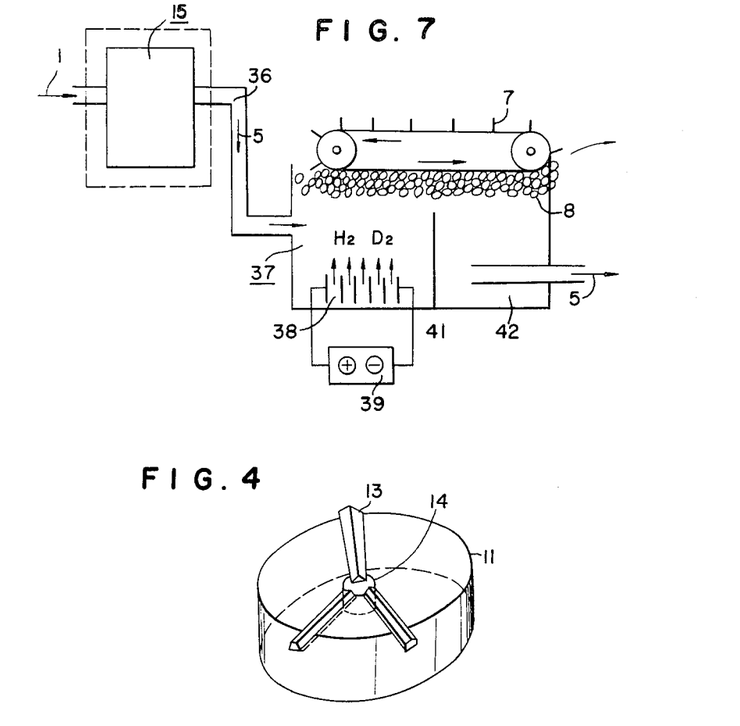
FIG. 4 is a schematic view of a spacer used in FIG. 3.
FIG. 7 is a schematic view of an electrolytic drainage treating apparatus equipped with the electrolyzer of FIG. 3.

Contaminations in the gap are washed off by the drainage 1 which flows in the gap as the electrolyte. Thus, the electrolysis can be continuously performed with clean surfaces of anode 10 and cathode 11. The scale formed on the anode surface 10 which is relatively hard to remove by the flow of the drainage in the gap, can be skimmed by the relative movement of the spacer 13 which has a projection which is mounted on the cathode surface 11 as shown in FIG. 4. Accordingly, the deposition of scale on the anode surface 10 is prevented in order to uniformly dissolve the anode.

One example of the relative movement of the spacer 13 is illustrated referring to FIG. 3. The spacer 13 mounted on the cathode surface 11 is connected through the insulator plate 16 to the holder 22 and is held by the guide 18 to the vertical direction. A spline 19, an arm 20, a motor 21, an electrolytic cell 15, insulator plates 16, 17 are provided. The rotation of the motor 21 turns the spline 19 at the upper part of the holder 22 through the arm 20 whereby the spacer 13 moves relatively to the anode 10. The spacer 13 slides on the anode surface by the relative movement. Accordingly, it is necessary to have an insulator of high abrasive resistance in order to prevent an accidental short-circuit of both of the electrodes and in order to maintain the thin gap of about 0.5 - several mm.

In the above description, the spacer 13 is mounted on the cathode 11. Thus, if maintenance of the thin gap between the anode 10 and the cathode 11 is desired, it is possible to use spherical spacers and cylindrical roller spacers made of insulators on the guide groove 24 on the cathode surface 11 whereby the thin gap 12 is automatically maintained by rolling them.

In FIGS. 5a, b, spherical spacers 13' are used. The anode 10, the cathode 11, the hole 25 of the cathode from which the drainage is injected to the thin gap 12 are provided. The spherical spacers 13' are guided on the groove 24. In order to uniformly dissolve the surface of the anode 10 which faces the cathode 11, the reciprocal turning as shown in the drawing is effected. The spherical spacers 13' are turned by contacting with the anode surface 10 whereby the thin gap is automatically maintained depending upon the size of the spherical spacer.

Figure 5:
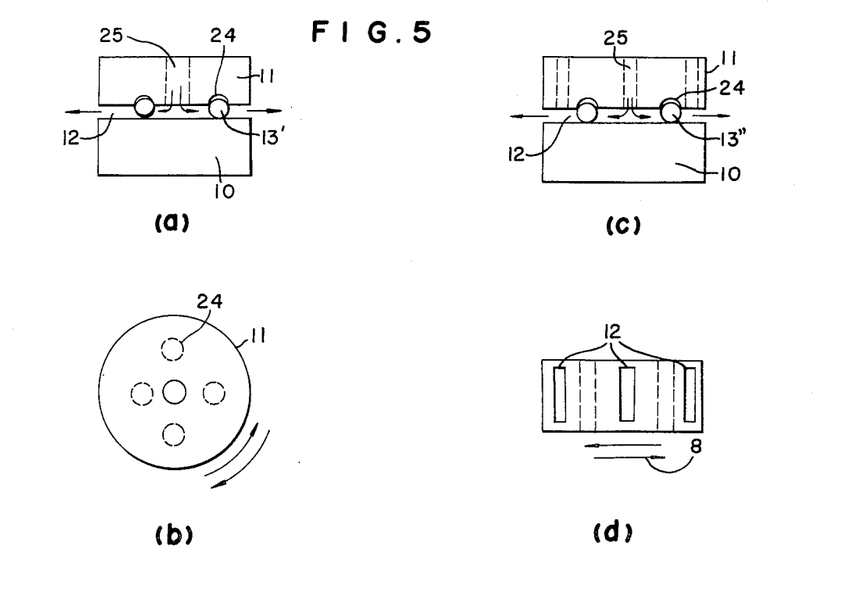

In FIGS. 5 c, d, the cylindrical roller spacers are used for rectangle electrodes. The cylindrical roller spacers 13'' are guided in the groove 24 and are turned by contacting the anode surface 10 by the reciprocal turning of the anode 10 and the cathode 11 in the direction of the arrow line B so as to maintain the thin gap corresponding to the diameter of the cylindrical roller spacers. The hole 25 of the cathode is to uniformly inject the drainage in the thin gap 12.

In the above embodiments, the maintenance of the thin gap between the electrodes is effected by the spacers and the adjustment of the electrodes for maintaining the constant gap spacing is effected by the dead weight of the cathode to the anode. However, when the deposit is removed only by the forcible flow without skimming by the spacer, the maintenance of the thin gap and the adjustment of the electrodes can be performed by using a servomechanism. One embodiment using the servomechanism for the adjustment of the electrodes is illustrated referring to FIG. 6.

Figure 6:
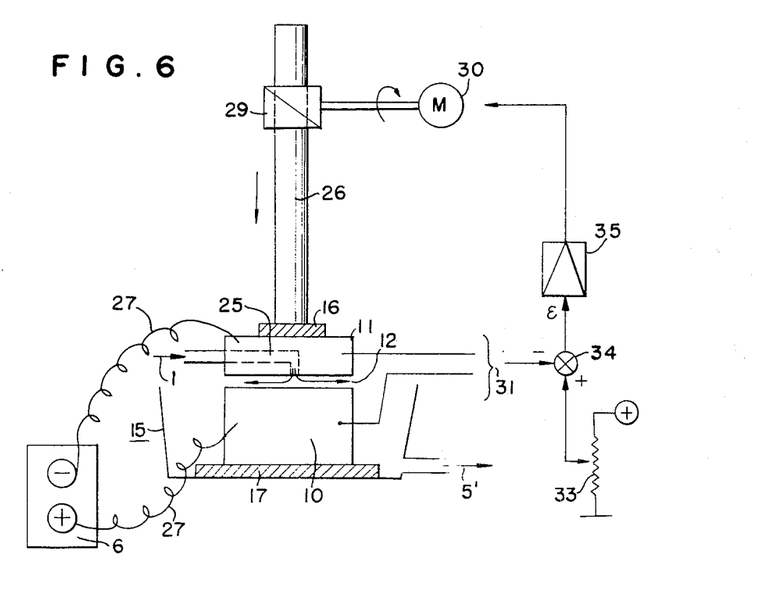
FIG. 6 is a schematic view of another embodiment of the invention.

In FIG. 6, cathode 11 is made of stainless steel or mild steel and the anode 10 is made of aluminum. The insulator plates 16, 17 are used for insulating the anode and the cathode from the cell 15 and the main shaft 26. The DC power source 6 feeds current through the wire 27 across the gap between the anode and the cathode. The drainage 1 is passed through the hole 25 of the cathode to inject it to the thin gap 12. During the time the drainage passes through the thin gap, aluminum ions are eluted to the drainage 1 whereby the floc is formed by the flocculating effect of aluminum ions. The treated drainage 5' is discharged in the next step. The cathode 11, the insulator plates 16 and the main shaft 26 are formed in one body. The mechanism 29 for converting the rotation of the electrode feeding motor 30 to linear movement under reduced speed is mounted at the upper part of the main shaft.

In order to maintain the gap between the anode 10 and the cathode 11 constant, the voltage drop corresponding to the width of the gap is detected and the voltage is adjusted so as to be substantially the same as the reference voltage. The detected voltage 31, Vs is compared with the reference voltage Vr by the potentiometer 33 at the point 34 and the differential value E = Vr − Vs is amplified by the amplifier 33 and the motor is driven by the output. In accordance with the above system, when the reference voltage is set at 20 volts, the gap is maintained constant corresponding to the voltage drop of 20 volts.

The electrolytic aluminum eluting mechanism has been described. Thus, in the practical drainage treatment, the treated drainage containing aluminum ions is transferred to the floc float-separating vessel 37 wherein the flocculated floc is separated from the clean drainage. In FIG. 7 of one embodiment of the electrylic drainage treating apparatus of the invention, the high speed electrolyzer 15 equipped with the aluminum anode cf FIG. 3 is used. The drainage 1 fed to the high speed electrolyzer 15 is transferred through the pipe 36 to the floc float-separating vessel 37 as the treated drainage 5' containing aluminum ions. The floc grown by the flocculating effect of aluminum ions is floated by the floating effect of hydrogen gas and oxygen gas generated by the electrolysis of water from the electrodes which are placed in the bottom of the floc float-separating vessel 37. The floated floc is separated from the clean drainage in the separating chamber 42 and the clean drainage 5 is discharged from the bottom of the chamber in the floc float-separating vessel. On the other hand, the floated floc is discharged to the system by skimming out with the scraper 7. The DC power source 39 for electrolysis of water is provided.

The embodiments using aluminum ions as the eluted ions have been described. However, sometimes, iron ions are optimum for flocculation. In said case, an anode made of iron is used in the electrolyzer.

Figure 8:
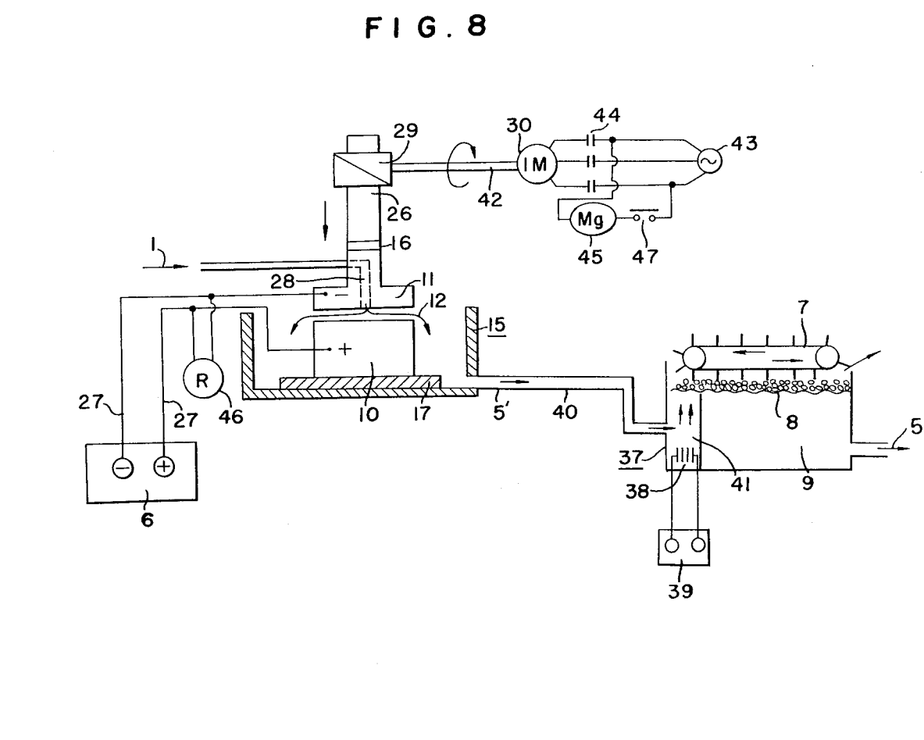
FIG. 8 is a schematic view of a control circuit for controlling the high speed electrolyzer.

The other mechanisms for controlling the gap are illustrated referring to FIGS. 8 – 14. In FIG. 8, the reference numerals 1 – 39 are same as those stated above. The drainage 5' containing aluminum ions is fed through the passage 40 of the floc float-separating vessel 37. The floc which is flocculated with the aluminum ions in the electrolyzer 41 is floated with hydrogen gas and oxygen gas (floc float gas) generated from the electrodes 38. The rotation of the AC motor 30 is transmitted to the reduction mechanism 29 in which the rotation is reduced and is converted to linear movement which is transmitted to the main shaft. The current is fed from the three phase AC power source 43 through the contact 44 of the electromagnetic switch to the AC motor 30. The excitation coil 45 is to pick up the contact 44. The relay 46 is to detect the voltage applied between the anode 10 and the cathode 11, and is to pick up and to drop out the contact 47 under a predetermined voltage. When the contact 47 is picked up, the excitation coil 45 is excited to pick up the contact 44 to drive the motor 30. When the contact 47 is deactivated, the contact 44 is deactivated to stop the motor 30.

Figure 9:
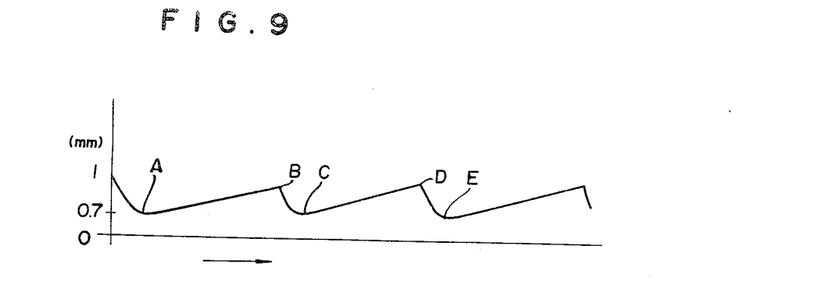
FIG. 9 is a graph of gap voltage versus time in the control circuit.
Figure 10:
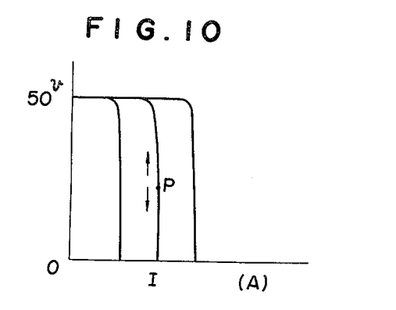
FIG. 10 is a graph of gap voltage versus current in the control circuit.
Figure 11:
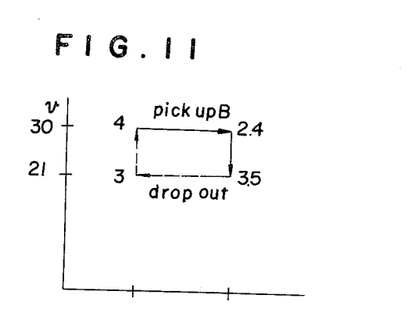
FIG. 11 is a performance chart of switching in the control circuit.

The operation of electrode adjustment of the invention is illustrated referring to FIGS. 9, 10 and 11. FIG. 10 shows a characteristic diagram of the DC power source 6 of FIG. 8, which is a constant-current characteristic. As shown in FIG. 10, when the maximum voltage is lower than 50 volts, the current is kept to a predetermined value $I_1$ amp even though the gap between the electrodes 10, 11 is changed, whereby the electrode voltage is changed, corresponding to the width of the gap. The operating point P is moved in the vertical direction corresponding to the width of the gap. It corresponds to the resistance in the gap. However, the specific resistance of the drainage does not fluctuate and accordingly the resistance in the gap is deemed to change in accordance with the width of the gap in the constant electrode area.

FIG. 9 shows a phase diagram of the width of the gap and the voltage across the gap to time when the current is generated in the practical operation in FIG. 8. In FIG. 9, the width of the gap is 0.7 mm and the voltage across the gap is 21 volts at the position A. When the current is fed from the position A, the anode 10 is dissolved depending upon the time necessary to gradually increase the width of the gap and the voltage corresponding to the width to reach position B. (width of gap 1 mm; voltage 30 volts). In position B, the relay 46 of FIG. 8 is actuated to pick up the contact 47 to drive the motor 30 so as to shift the cathode 11 to a lower position to narrow the width of the gap. When the voltage reaches 21 volts at the width of 0.7 mm, the relay 46 of FIG. 8 is actuated to drop out the contact 47. The shift of the cathode 11 is stopped at the position C in FIG. 9.

When the anode 10 is further dissolved, the width of the gap and the voltage across the gap increase to reach the position D. The shift of the cathode is started again and is stopped at the position E. The operation is repeated to maintain the width of the gap to 0.7 mm – 1.0 mm.

FIG. 11 shows the operating characteristic diagram of the relay 46. In FIG. 11, B shows the picking up of contact 47 at 30 volts. The contact 47 continues to pick up until the voltage decreases to 70% of the initial value to the position C in FIG. 11. At the position C, the contact is switched to drop out. The contact 47 continues to drop until the voltage increases from C to D. At the position D, the contact is switched to pick up. The operation is repeated. By using the relay having the characteristic of pick up and drop out which can set a desirable pick up voltage and drop out voltage, the width of the gap can be maintained without difficulty by using an ON-OFF control and a simple circuit mechanism.

FIG. 9 shows the example wherein the width of the gap is controlled in the range of 0.7 – 1.0 mm. When the difference between the pick up voltage and the drop out voltage is small, the change of the width of the gap can be decreased. The width of the gap can be set by changing the predetermined value of the pick up voltage. The ON-OFF control detecting the voltage across the gap is detected by the relay 46 using a DC power source having a constant current characteristic. It is also possible to operate the ON-OFF control for shifting the cathode by using a relay having the same characteristics of the relay 46 of FIG. 8 in the DC power source 6 having the constant voltage characteristic of FIG. 14.

Figure 12:
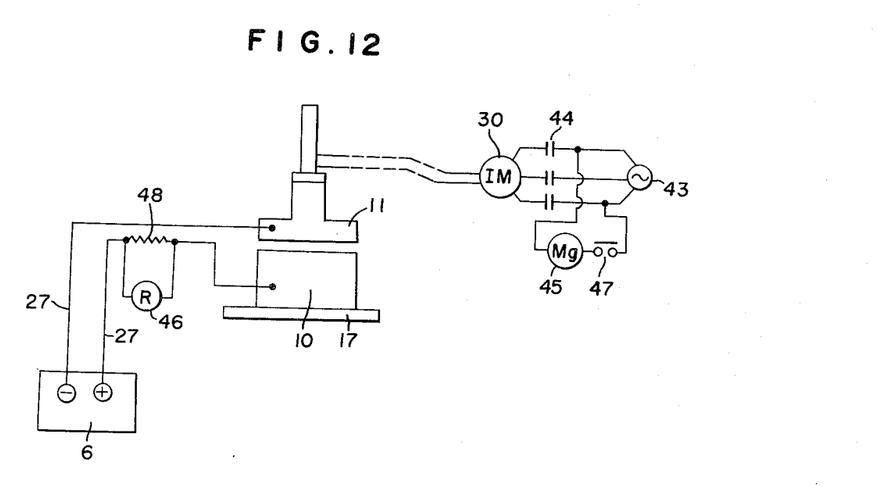
FIG. 12 is a schematic view of another control circuit.

FIG. 12 is a schematic view of the electrolyzer (similar to FIG. 8) showing the various parts.

The structure is similar to that of FIG. 8 except that a shunt 48 (small resistor) is inserted in series. The voltage V ($V = Ir$) is proportional to the current I passing the wire 27 and is applied to both ends of the shunt 48. The resistance of the shunt 48 is designated by $r$. The voltage is detected by the relay 46.

Figure 13:
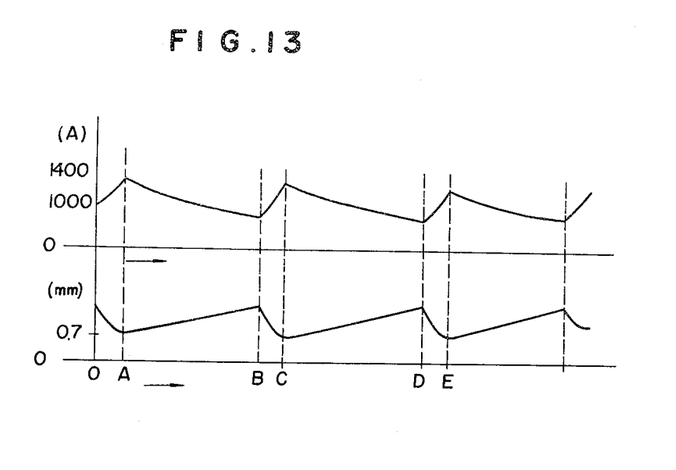
FIG. 13 is a phase diagram of discharge current and gap width versus time in the control circuit of FIG. 12.
Figure 14:
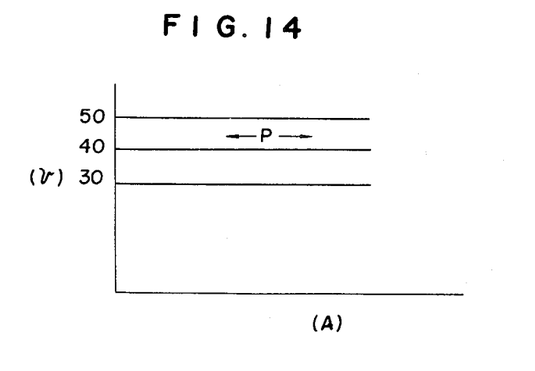
FIG. 14 is a graph of gap voltage versus current in the control circuit of FIG. 12.

FIG. 13 shows a phase diagram of the width of the gap and the current passing across the gap with respect to time. The change of the current corresponds to the change of voltage applied to both ends of the shunt 48. When the current of 1400 A is passed across the gap (0.7 mm width), at the position A, the anode 10 is dissolved. Accordingly, the current gradually decreases, as the power source has a constant voltage characteristic, to reach 1000 A (1 mm width) at the position B. The voltage applied between both ends of the shunt 48 decreases corresponding to the current. Accordingly, the contact 47 drops out in a range of the shunt voltage corresponding to the current decreasing from 1400 A to 1000 A. At the position of the shunt voltage corresponding to 1000 A, the contact picks up whereby the motor 30 is driven to narrow the width of the gap and the current increases. At the position C of FIG. 12, the width of the gap is 0.7 mm and the current is 1400 A. The pick up of the contact 47 is kept to the shunt voltage corresponding to 1400 A. The contact 47 drops out at C, and the drop out is kept to D.

Figure 15:
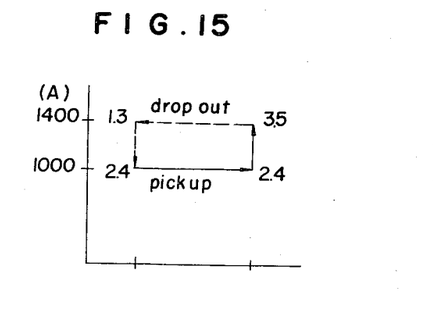
FIG. 15 is a performance chart of switching in the control circuit of FIG. 12.

It is possible to control the change of the current that is the width of the gap, by using a power source having a constant voltage characteristic having the hysteresis of the relay 46. FIG. 15 shows the operating characteristic diagram for the hysteresis characteristic of the relay 46 and the contact 47.

The values at each of the positions correspond to those of FIG. 13. In FIG. 15, "pick up" means OFF → ON and "drop out" means ON → OFF. The system using the constant voltage power source has significant advantages even though the current is fluctuated by the ON-OFF control as compared with the system using a constant current power source since the combination of the transformer and rectification is quite economical.

Figure 16:
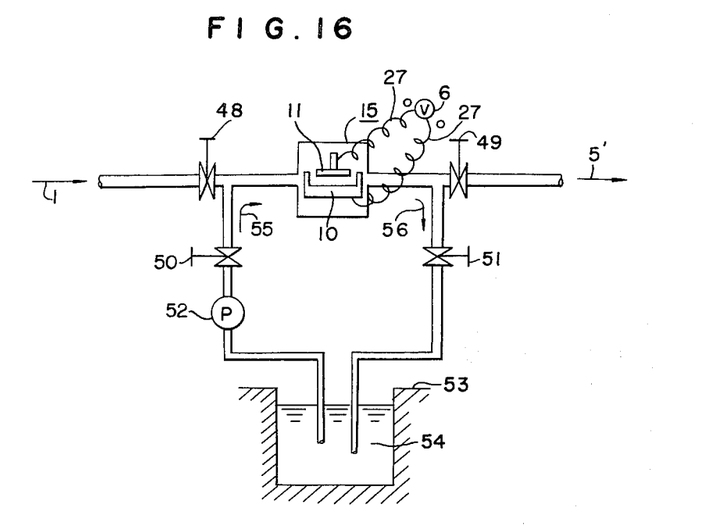
FIG. 16 is a schematic view of an improved apparatus equipped with the electrolyzer of FIG. 3.

The invention is further illustrated referring to FIG. 16 which is a partially enlarged view of FIG. 7 shown by the dotted line. The purpose of this embodiment is to remove the passive state membrane on the anode. The contaminated materials such as floc and gas etc. formed in the gap between the anode 10 and the cathode 11 are washed out by the drainage which forcibly passes through the gap as stated above. Moreover, the mechanical removing by the spacer 13 for the scale that is hard to remove by the drainage 1 has been proposed as stated above.

However, sometimes, the anode passive state membrane cannot be removed by the flow of drainage or by mechanical means. A novel method of removing the stiff membrane is illustrated. The membrane is electrochemically dissolved and removed by performing the electrolysis by passing an acidic or alkaline solution through the gap instead of the drainage 1. Referring to FIG. 16, the electrolysis by passing acidic or alkaline solution through the gap instead of the drainage is illustrated. In FIG. 16, the valves 48, 49 are shut and the valves 50, 51 are opened, the pump 52 is actuated to pass the aqueous solution of sodium hydroxide 54 from the tank 53 to the flow direction 55 so as to feed the high speed electrolyzer 15, and DC current is passed by the power source 6 to perform the electrolysis for dissolving and removing the membrane. On the other hand, the aqueous solution of sodium hydroxide is returned to the tank 53 whereby the aqueous solution of sodium hydroxide can be completely recovered without discharging it from the system.

The gap between the electrodes of the high speed electrolyzer is quite small as stated above in comparision with that of the conventional method. The electrolyzer has the structure for electrolyzing under low voltage and high current density. Accordingly, the quantity of the aqueous solution of sodium hydroxide passing the closed high speed electrolyzer can be quite small and the scale can be easily removed by dissolving it. The example using sodium hydroxide for dissolving the membrane has been described. Thus, an effective result can be obtained by using an acidic solution such as a chromic acid-phosphoric acid mixture, a hydrochloric acid or an organic solvent instead of sodium hydroxide.

Figure 17:
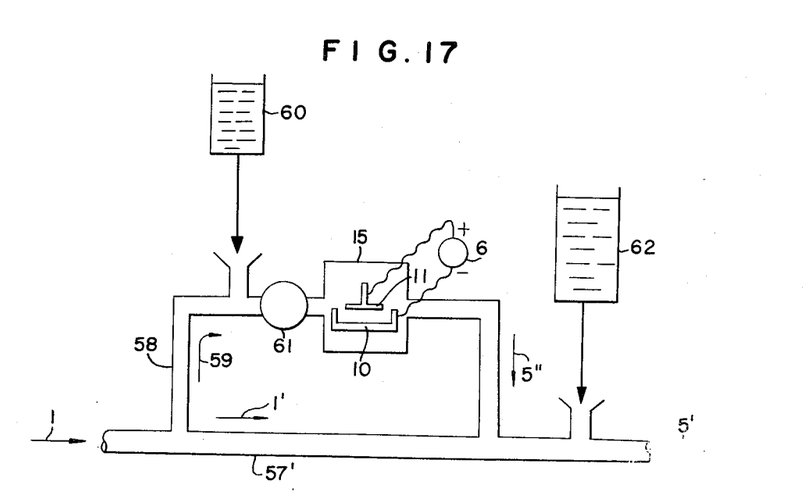
FIGS. 17, 18 and 19 are schematic views of other embodiments of the apparatus of the invention.

Referring to FIG. 17, another embodiment of the invention is illustrated. In FIG. 17, the reference numeral 1 designates the drainage containing colloidal material, 57 designates the main passage of the drainage 1; 58 designates the shunt branched from the main passage 57; 59 designates the divided drainage passing the shunt 58; 60 designates the tank for electrolyte from which the electrolyte such as sodium chloride, sodium hydroxide, etc, is added to the divided drainage 59 so as to decrease the specific resistance; 61 designates the pump; 15 designates the closed type high speed electrolyzer; 11 designates the cathode of the electrolyzer 15; 10 designates the anode; 11 designates the cathode which forms the thin gap with the spacer 13; 6 designates the power source which applies DC voltage across the electrodes 10, 11; 5'' designates the electrolytic solution; 1' designates the main drainage 1 passing the main passage 57; 62 designates the tank placed in the position combining the electrolytic treated drainage with the main drainage 1'; and 15' designates the treated drainage.

The anode 10 is made of aluminum or iron and the cathode 11 is made of stainless steel or other conductive material. The electrolysis is performed by the high speed electrolyzer 15 in said system. The contaminated materials formed by the electrolysis are washed out by the forcible flow of the divided drainage 59 to give clean surfaces of the electrodes whereby the polarization is small. Moreover, the specific resistance of the divided drainage 59 is kept low by the addition of the electrolyte. Accordingly, it is possible to electrolyze under low voltage, high current density and high current concentration. The electrolysis can be performed in current density of 10 – 100 A/cm$^2$ and current concentration of 10 – 50 A/l. As the divided drainage 59 is used as the electrolytic solution, the quantity of the electrolyte added for improvement of the specific resistance can be small. The electrolytic treated drainage 5' obtained by the electrolysis under low voltage, high current density and high current concentration in the electrolyzer 15 is combined with the main drainage 1' whereby the colloidal suspension in the drainage 1 is flocculated by the electrochemical effect of aluminum ions to clean the drainage 1. The duration of the electrochemical effect of the aluminum ions in the treated drainage 5'' to the colloidal suspension is only several minutes and the effect decreases rapidly thereafter. In order to prevent this, a small amount of sulfuric acid or hydrochloric acid is added from the tank 62 to the treated drainage 5'. This is done without decreasing the electrochemical effect of aluminum ions to the colloidal suspension.

As stated above, it is possible to remove the contaminated materials by forcibly passing the drainage having improved specific resistance through the gap between the electrodes whereby the electrolysis can be performed under low voltage, high current density and high current concentration. Accordingly, a desirable concentration of aluminum ions can be obtained for short electrolytic operation even though high aluminum ion concentration is required. In order to improve the electrochemical effect of aluminum ions to the colloidal suspension, sulfuric acid or hydrochloric acid may be added. Excellent results have been realized.

Figure 18:
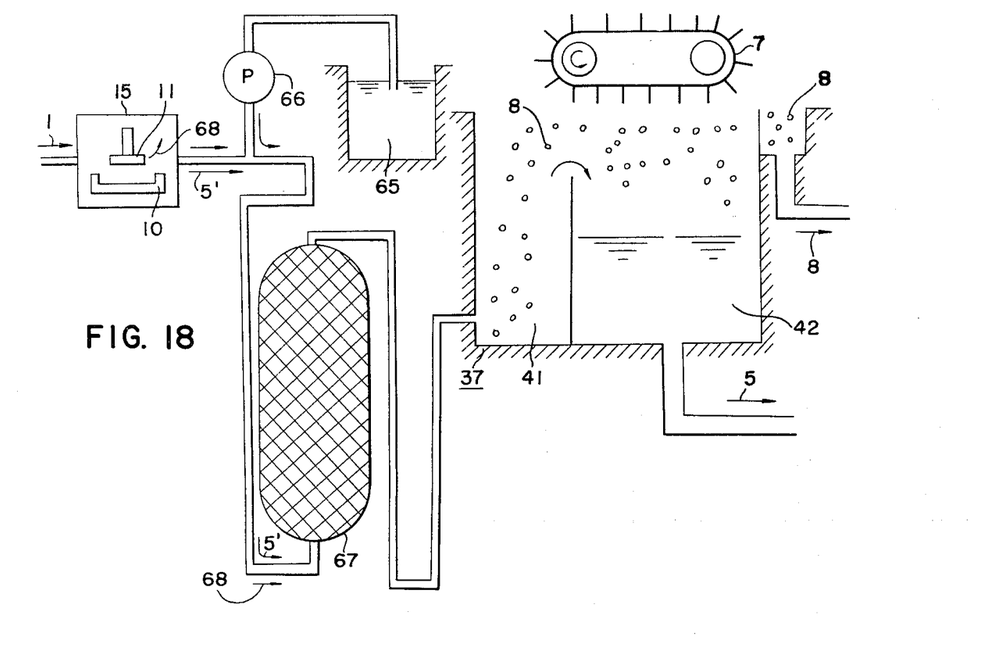

The other embodiment is illustrated referring to FIG. 18. The embodiment is to treat the drainage by the high speed electrolyzer wherein the hydrogen gas 68 generated from the cathode 11 is used for floating the floc whereby effect for improving growth of the floc in the electrolyzer is increased. In FIG. 18, the reference numeral 15 designates the high speed electrolyzer shown in FIG. 3 wherein the anode 10 and cathode 11 are disposed with thin gap therebetween through which the drainage is forcibly fed. The high speed electrolyzer 15 has a closed structure for continuous electrolytic operation whereby the hydrogen gas 68 generated by the electrolysis is discharged from the high speed electrolyzer 15 with the treated drainage 5'. The polymer flocculant 65 is added to the treated drainage 5' by the pump 66 to feed to the flocculator 67 wherein the floc is grown. Simultaneously, the gas generated by the electrolysis (mainly hydrogen gas 68 generated from the cathode 11) is combined with the floc. The treated drainage is fed to the floc float-separating vessel 37 wherein the floated floc is removed as the scum 8 by the skimmer 7 and clean treated drainage 5' is discharged. The high speed electrolyzer 15 used in the embodiment has the structure as shown in FIG. 3.

The high speed electrolyzer 15 has a closed structure which effects continuous electrolysis. Accordingly, the gas 68 generated by the electrolysis is carried with the treated drainage 5' to the flocculator 67 to be used as the gas for floating. The function of the flocculator 67 is to flocculate the insoluble suspension in the drainage by the aluminum ions added by the electrolysis, to grow the floc to the large size necessary and to combine the gas with the floc without discharging the gas generated by the electrolysis so as to impart a high floating effect. The flocculator 67 should be kept in gas-tight condition and should feed the treated drainage from the bottom to the upper direction so as to prevent separation of the gas generated by the electrolysis from the treated drainage.

The embodiment of the invention has the following advantages. The gas generated by the aluminum electrolysis using the drainage as the electrolytic solution (mainly hydrogen gas generated in the cathode) is completely used as the gas for floating the floc. The electrolysis for eluting aluminum ions and the float-separation are performed by different apparatus through the flocculator 67. The time for growing the floc can be increased by retaining the treated drainage in the flocculator 67. Accordingly, the fine floc is grown to be easily floated and separated. In order to assist the growth of the fine floc to give mechanical stability of the floc, the polymer flocculant is added. The above-mentioned advantages are given to separate the floc completely and to prevent contamination of fine floc by the treated drainage.

Figure 19:
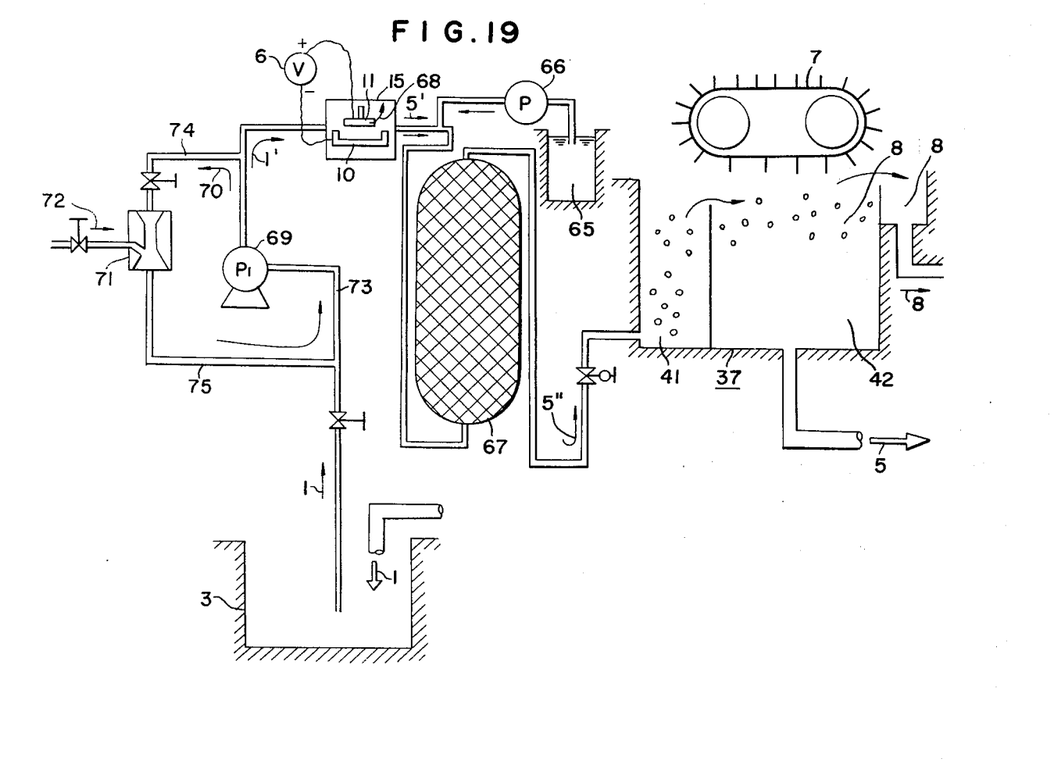

The other embodiment of the invention is illustrated in FIG. 19, which shows an improvement of the embodiment of FIG. 18. The purpose of this embodiment is to overcome the disadvantage that the quantity of hydrogen gas 68 generated in the cathode 11 is not sufficient to impart the floating effect to the floc. The structure for injecting the drainage 1 to the closed high speed electrolyzer 15 and for feeding the treated drainage 5' to the flocculator 67 is the same as that of FIG. 18. Incidentally, the polymer flocculant 65 should be added under high pressure by the pump 66 according to Henry's rule. When a relatively large amount of insoluble suspension is contained in the drainage, a large amount of the floc is formed. In this case, it is necessary to increase the quantity of the gas for floating the floc. It is not enough to use only the gas generated in the high speed electrolyzer 15. In this case, as stated with reference to FIG. 19, the apparatus for adding the additional gas in the electrolytic solution is used to complete the floating of the floc. The drainage 1 pumped from the passage 73 by the pump 69 is divided by the shunt 74 to yield the divided drainage 70 which is fed to a gas-liquid mixer 71 such as an ejector. The drainage is mixed with air and is returned to the feed-back passage 75 to the pump 69 so as to obtain the air containing drainage 1' which assists the floating of the floc when the effect caused by the gas generated in the high speed electrolyzer 15 is not sufficient.

Incidentally, when a turbine pump is used as the pump 69 to impart pressure of about 5 kg/cm$^2$, the volume of air 72 aspirated is preferably in the range of water volume $L_1$ / air colume $G > 35$. When $L_1/G < 35$, the air in the pump is too much to aspirate. The valves 17, 19, 20 are used to control the rate of $L_1/G$. If the air is contained in the drainage fed to the electrolyzer 15 under pressure by using the apparatus for adding air, the drainage is fed as turbulent flow of the electrolytic solution when passing through the thin gap between the electrodes. Accordingly, cavitation is prevented to impart uniform elution of aluminum of the anode so as to perform a stable electrolytic operation. The feed of the treated drainage 5' is performed from the bottom of the flocculator 67 and the treated drainage 5' containing solubilized gas is discharged from the upper part of the flocculator. The air added by the apparatus and the gas generated by the electrolysis should be dissolved in the treated drainage. Accordingly, the flocculator should be a closed structure used for continuous operation. The advantage of this embodiment is continuous operation whereby all of the gas generated by the electrolysis (mainly hydrogen gas from the cathode) can be used for floating of the floc.

The treated drainage is under higher pressure whereby the gas generated by the electrolysis and the air added by the gas-liquid mixer can be dissolved in it. The solubilized gas forms fine bubbles in the float-separating vessel to float all of the floc whereby clean treated drainage can be obtained. Moreover, the time for growth of the fine floc is increased as the treated drainage is retained in the flocculator for a long time. The solid-liquid separation can be easily performed as the polymer flocculant is added to improve the mechanical stability and growth of the floc. When a large amount of the floc is formed and a large volume of gas for floating the floc is required, the gas can be supplied from the gas-liquid mixer and the trouble of incomplete floating of the floc can be prevented. The effect for preventing cavitation formed on the surface of electrodes can be imparted by mixing air in the drainage used as the electrolytic solution by the gas-liquid mixer under higher pressure. As a result, the uniform elution of aluminum of the anode and stable electrolysis are accomplished.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. An electrolytic drainage treating apparatus comprising:
    a high speed electrolyzer comprising an anode and a cathode with a thin gap therebetween,
    means for forcibly passing at a high velocity a drainage as an electrolytic solution through said gap,
    means for eluting the anode material as ions,
    the gap being thin enough and the velocity being high enough to wash out materials formed between the electrodes by the electrolysis,
    the gap being less than 1 mm.,
    whereby contaminated materials in the drainage are flocculated by the ions.

2. The electrolytic drainage treating apparatus according to claim 1 wherein the anode is made of aluminum or iron so as to elute aluminium or iron ions.

3. The electrolytic drainage treating apparatus according to claim 1 further comprising means to maintain the width of the gap between the anode and the cathode by detecting the electrical condition of the gap and shifting the cathode or anode in accordance therewith.

4. The electrolytic drainage treating apparatus according to claim 1 wherein the cathode has a hole for passing the drainage to the gap.

5. The electrolytic drainage treating apparatus according to claim 1 wherein the gap is maintained by a spacer made of an electric insulator which is mounted on the cathode.

6. The electrolytic drainage treating apparatus according to claim 1 wherein the anode surface is parallel to the cathode surface.

7. The electrolytic drainage treating apparatus according to claim 1 wherein spherical spacers are fitted on the cathode surface and contact the anode surface to slide on the anode surface upon movement of the cathode.

8. The electrolytic drainage treating apparatus according to claim 1 which further comprises:
    means for detecting the voltage across the gap;
    means for comparing the detected voltage with a reference voltage;
    means for positioning the cathode or the anode so as to yield a detected voltage equal to the reference voltage.

9. The electrolytic drainage treating apparatus according to claim 1 further comprising means to pass an acidic or alkaline solution or a solvent through the gap to remove a passive state membrane formed on the anode surface.

10. The electrolytic drainage treating apparatus according to claim 1 further comprising means to dispose the high speed electrolyzer in an acidic or alkaline solution, means to feed the solution to the electrolyzer for a predetermined period and means for stopping the feed and the discharge of the drainage.

11. The electrolytic drainage treating apparatus according to claim 1 wherein the drainage containing colloidal material includes an acid.

12. The electrolytic drainage treating apparatus according to claim 1 further including:
    a main passage for dividing a part of the drainage, which is connected to the passage for treated drainage discharged from the high speed electrolyzer; and
    means for adding an acidic solution to the passage for feeding the drainage to the high speed electrolyzer.

13. The electrolyzer drainage treating apparatus according to claim 1 wherein the high speed electrolyzer is a closed structure, the electrolyzer drainage treating apparatus further comprising means for feeding the treated drainage discharged from the high speed electrolyzer from the bottom of a closed type flocculator for growing floc and means for discharging the treated drainage containing grown floc from the upper part of the flocculator to separate the floc.

14. The electrolytic drainage treating apparatus according to claim 13 further comprising means to add a polymer flocculant under high pressure.

15. The electrolytic drainage treating apparatus according to claim 13 further comprising means to mix a gas with the drainage.

16. The electrolytic drainage treating apparatus according to claim 1 further comprising:
    a main passage for feeding drainage from a tank to the high speed electrolyzer;
    a pump for feeding the drainage provided in the main passage;
    a shunt passage for feeding part of the drainage to an ejector;
    a feedback passage for feeding the drainage containing gas mixed in the ejector to the main passage.

17. An electrolytic drainage treating apparatus comprising:
    a high speed electrolyzer comprising an anode and a cathode with a thin gap therebetween,
    means for forcibly passing at a high velocity a drainage as an electrolytic solution through said gap,
    means for eluting the anode material as ions,
    the gap being thin enough and the velocity being high enough to wash out material formed between the electrodes by the electrolysis,
    a spacer made of an electric insulator mounted on the cathode surface to make contact with the anode surface so that scale formed on the anode surface can be removed by movement of the spacer with respect to the anode surface,
    whereby contaminated materials in the drainage are flocculated by the ions.

18. The electrolytic drainage treating apparatus according to claim 17 wherein the spacer is disposed in a radial direction from the center of the cathode.

19. The electrolytic drainage treating apparatus according to claim 17 wherein the spacer is formed in the shape of a rod having a peak.

20. The electrolytic drainage treating apparatus according to claim 17 wherein a groove is formed on the cathode surface and cylindrical spacers are fitted to the groove.

21. An electrolytic drainage treating apparatus equipped with a high speed electrolyzer comprising:

an insulator plate mounted on bottom of the electrolyzer;
an anode placed on the insulator plate;
a cathode disposed next to the anode with a thin gap therebetween;
a holder mounted on the cathode on the surface opposite to the anode through an insulator plate;
a motor for turning the holder;
a spacer mounted on the cathode surface opposite the anode so as to slide on the anode surface; and
means for forcibly passing a drainage through the gap.

22. An electrolytic drainage treating apparatus comprising:
a high speed electrolyzer comprising an anode and a cathode with a thin gap therebetween,
means for forcibly passing at a high velocity a drainage as an electrolytic solution through said gap,
means for eluting the anode material as ions,
the gap being thin enough and the velocity being high enough to wash out materials formed between the electrodes by the electrolysis,
means to detect the electrical condition of the gap,
means to adjust the cathode relative to the anode in accordance with the electrical condition of the gap to maintain a gap having a width from 0.1 – 10 mm.,
whereby contaminated materials in the drainage are flocculated by the ions.

23. The electrolytic drainage treating apparatus according to claim 22 wherein the means to detect the electrical condition of the gap comprises current fluctuation detection means.

24. The electrolytic drainage treating apparatus according to claim 22 further comprising:
a relay for detecting voltage fluctuation of the gap,
a contact which is activated when the detected voltage of the relay reaches a predetermined value;
means for driving a motor during the time the contact is activated; and
a mechanism for converting rotation of the motor to linear movement at a reduced rate for changing the width of the gap.

25. The electrolytic drainage treating apparatus according to claim 23 wherein a DC power source with a contant current characteristic is connected in series to the anode and the cathode.

26. The electrolytic drainage treating apparatus according to claim 25 further comprising means dependent upon the value of the voltage for deactivation and actuation of the relay for controlling the width of the gap.

27. The electrolytic drainage treating apparatus according to claim 25 further comprising a DC power source having a constant voltage characteristic connected through a resistor in series to the anode and the cathode and relay means to detect the voltage between both ends of the resistor.

* * * * *